(12) United States Patent
Burtch (10) Patent No.: US 8,282,812 B2
(45) Date of Patent: Oct. 9, 2012

(54) APPARATUS FOR PRODUCING HYDROGEN FROM SALT WATER BY ELECTROLYSIS

(76) Inventor: John Christopher Burtch, Scarborough (CA)

( * ) Notice: Subject to any disclaimer, the term of this patent is extended or adjusted under 35 U.S.C. 154(b) by 212 days.

(21) Appl. No.: 12/825,425

(22) Filed: Jun. 29, 2010

(65) Prior Publication Data

US 2010/0258450 A1    Oct. 14, 2010

Related U.S. Application Data

(63) Continuation-in-part of application No. 12/379,503, filed on Feb. 24, 2009, now abandoned.

(51) Int. Cl.
C25B 1/06 (2006.01)
C25B 9/06 (2006.01)

(52) U.S. Cl. ..................... 205/639; 204/278.5

(58) Field of Classification Search .................. 205/621, 205/639
See application file for complete search history.

(56) References Cited

U.S. PATENT DOCUMENTS

| | | | |
|---|---|---|---|
| 3,766,045 A * | 10/1973 | Itakura et al. | 204/278.5 |
| 4,512,857 A | 4/1985 | Chamberlin | |
| 5,089,107 A | 2/1992 | Pacheco | |
| 5,110,436 A | 5/1992 | Schubert et al. | |
| 6,524,453 B1 * | 2/2003 | De Souza et al. | 204/270 |
| 7,122,109 B2 | 10/2006 | Rantala et al. | |
| 7,674,358 B2 | 3/2010 | Gibson et al. | |
| 2006/0183010 A1 | 8/2006 | Davis et al. | |
| 2007/0163877 A1 * | 7/2007 | Brown et al. | 204/297.02 |
| 2008/0245673 A1 * | 10/2008 | Ghosh et al. | 205/639 |

FOREIGN PATENT DOCUMENTS

| | | |
|---|---|---|
| CA | 1259053 | 9/1989 |
| CA | 2062739 | 12/1990 |
| CA | 2038537 | 9/1992 |
| CA | 2124616 | 12/1994 |
| CA | 2597068 | 12/2008 |
| CA | 2728757 | 12/2009 |

* cited by examiner

*Primary Examiner* — Harry D Wilkins, III
(74) *Attorney, Agent, or Firm* — Bereskin & Parr LLP/S.E.N.C.R.L., s.r.l.

(57) ABSTRACT

An apparatus for producing hydrogen from salt water by electrolysis. The apparatus includes a cathode plate and an anode plate spaced apart from the cathode plate. The apparatus also includes a cathode end connector for electrically connecting the cathode plate to a negative terminal of a direct current electrical power supply, and an anode end connector for electrically connecting the anode plate to a positive terminal of the direct current electrical power supply. The cathode plate is made from aluminum, and the anode plate is made from zinc. The aluminum cathode plate may have a multiplicity of apertures therein. It has been determined that the aluminum cathode plate and the zinc anode plate tend to provide an effective combination for salt water electrolysis.

20 Claims, 5 Drawing Sheets

APPARATUS FOR PRODUCING HYDROGEN FROM SALT WATER BY ELECTROLYSIS

RELATED APPLICATIONS

This application is a continuation-in-part of U.S. application Ser. No. 12/379,503 filed Feb. 24, 2009 and entitled "METAL PLATE STACK FOR SALT WATER ELECTROLYSIS" now abandoned.

TECHNICAL FIELD

The invention relates to apparatus and methods for producing hydrogen from salt water by electrolysis.

BACKGROUND

Electrolysis is a known method of producing hydrogen gas from water in which two electrodes are placed in water and an electrical power supply is connected to the electrodes. The positively charged electrode is called the anode and the negatively charged electrode is the called the cathode. When performing fresh water electrolysis, water decomposes into hydrogen gas and oxygen gas. Hydrogen tends to form at the cathode and oxygen tends to form at the anode.

One problem with the fresh water electrolysis is that fresh water has poor electrical conductivity, which prevents the flow of electrons from the electrical power supply, through the cathode, and to the anode. Without the flow of free electrons, the electrochemical reactions cannot occur, and water will not decompose into hydrogen and oxygen. For this reason, an electrolyte such as salt (e.g. sodium chloride) is added to the water so as to provide ions, which tends to increase the conductivity of water and improve the efficiency of electrolysis.

While salt water electrolysis is more efficient than fresh water electrolysis, salt water electrolysis is still a relatively inefficient process for producing hydrogen. As a result, salt water electrolysis represents only a small fraction of the total hydrogen production worldwide.

Increasing the efficiency of salt water electrolysis could substantially increase the amount of hydrogen produced worldwide. In particular, oceans are an abundant source of salt water and could be utilized to extract large amounts of hydrogen for use in commercial and industrial applications. However, this is not practical until salt water electrolysis becomes more efficient.

Accordingly, there is a need for new or improved apparatus and methods for producing hydrogen from salt water by electrolysis.

SUMMARY OF THE INVENTION

According to one aspect of the present invention there is provided an apparatus for producing hydrogen from salt water by electrolysis. The apparatus includes at least one cathode plate, and at least one anode plate spaced apart from the cathode plate. The apparatus also includes a cathode end connector for electrically connecting the cathode plate to a negative terminal of a direct current electrical power supply, and an anode end connector for electrically connecting the anode plate to a positive terminal of the direct current electrical power supply. The cathode plate is made from aluminum, and the anode plate is made from zinc.

The aluminum cathode plate may have a multiplicity of apertures therein. For example, the aluminum cathode plate may comprise a perforated aluminum cathode plate such that the apertures are uniformly distributed in rows and columns. The apertures in the cathode plate may have a diameter of between approximately 0.030 and 0.100 inches. More particularly, the apertures in the cathode plate may have a diameter of approximately $\frac{1}{16}$ of an inch and a density of approximately 64 apertures per square inch.

The apparatus may also include at least one non-conductive spacer coupled to the cathode plate and the anode plate for spacing apart the cathode plate from the anode plate in an electrically insulated manner. The cathode plate may be removably connected to the non-conductive spacer such that the cathode plate is replaceable.

The apparatus may also include a gas separator for separating gases produced by electrolysis on the cathode plate and the anode plate. The gas separator has an inlet positioned for receiving the gases, a first outlet for exhausting a first type of gas, and a second outlet for exhausting a second type of gas. The gas separator may also include a gas filter disposed between the inlet and the first outlet and downstream of the second outlet. The gas filter is configured to allow the first type of gas to flow through the filter and to the first outlet, and configured to block the second type of gas such that the second type of gas flows to the second outlet.

According to another aspect of the present invention there is provided an apparatus for producing hydrogen from salt water by electrolysis. The apparatus includes a stack of plates including a plurality of cathode plates and a plurality of anode plates. The cathode plates and the anode plates are arranged in an alternating sequence such that each cathode plate is spaced apart from an adjacent anode plate. The apparatus also includes a plurality of cathode connectors for electrically interconnecting the plurality of cathode plates, and a plurality of anode connectors for electrically interconnecting the plurality of anode plates. The apparatus also includes a direct current electrical power supply configured to provide direct current to the cathode plates and the anode plates. The apparatus also includes a cathode end connector electrically connected to one of the cathode plates and electrically connected to a negative terminal of the direct current electrical power supply, and an anode end connector electrically connected to one of the anode plates and electrically connected to a positive terminal of the direct current electrical power supply. Each cathode plate is made from aluminum, and each anode plate is made from zinc.

Each plate may have a size of approximately four inches square. In some embodiments, there may be five zinc anode plates and four aluminum cathode plates. Furthermore, the power supply may be configured to provide between approximately 0.8 and 1.2 volts and between approximately 0.8 and 1.2 amperes.

The plurality of anode plates may include a first solid end plate and a second solid end plate disposed at opposing ends of the stack.

According to another aspect of the present invention there is provided a method of producing hydrogen from salt water by electrolysis. The method includes placing a stack of plates in salt water. The stack includes at least one cathode plate and at least one anode plate. The cathode plate and the anode plate are arranged such that the cathode plate is spaced apart from the anode plate. The cathode plate is made from aluminum, and the anode plate is made from zinc. The method also includes connecting the cathode plate to a negative terminal of a direct current electrical power supply, connecting the anode plate to a positive terminal of the direct current electrical power supply, providing direct current to the cathode plate and the anode plate, and collecting hydrogen gas produced by the plates.

The step of providing direct current may include providing between approximately 0.8 and 1.2 volts of electrical power.

What has been described is merely illustrative of the application of the principles of the embodiments. Other arrangements and methods can be implemented by those skilled in the art without departing from the spirit and scope of the embodiments described herein.

BRIEF DESCRIPTION OF THE DRAWINGS

The invention will now be described, by way of example only, with reference to the following drawings, in which.

DETAILED DESCRIPTION OF THE INVENTION

Figure 1:
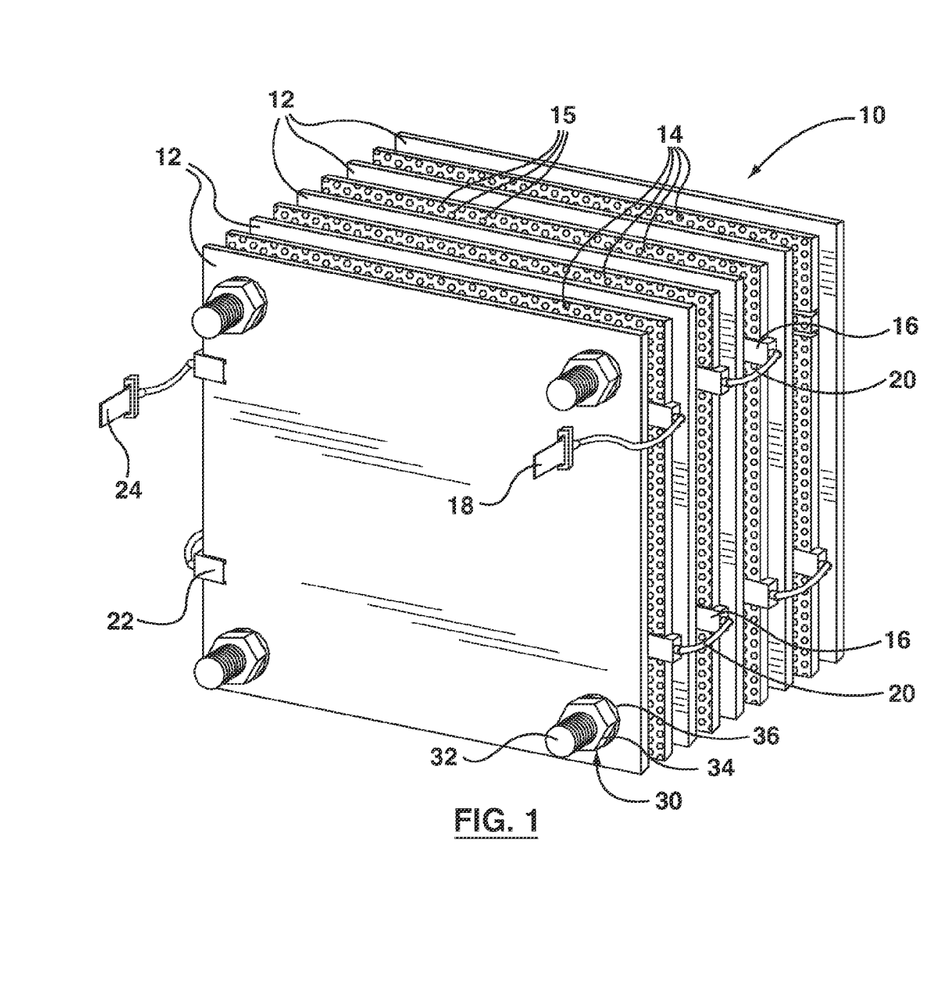
FIG. 1 is a perspective view of an apparatus including a stack of metal plate electrodes for producing hydrogen from salt water electrolysis according to an embodiment of the invention.

Referring to FIG. 1, illustrated therein is an apparatus 10 for producing hydrogen from salt water electrolysis made in accordance with an embodiment of the invention. The apparatus 10 includes metal plates arranged in an electrolysis stack. In particular, the apparatus 10 includes anode plates 12 and cathode plates 14. The plates can be placed in salt water and connected to an electrical power supply (not shown) so as to perform salt water electrolysis.

During electrolysis, hydrogen bubbles tend to form around the cathode plates 14. One of the bi-products of salt water electrolysis is sodium hydroxide (NaOH), which also tends to form around the cathode. The inventor has recognized that a combination of aluminum and sodium hydroxide tends to result in the production of hydrogen according to the following reaction:

$$2Al(s) + 6NaOH(aq) \rightarrow 3H_2(g) + 2Na_3AlO_3(aq) \quad (1)$$

In view of this chemical reaction, the electrolysis apparatus 10 of the present invention utilizes cathode plate(s) 14 made of aluminum. The aluminum tends to react with the sodium hydroxide that forms around the cathode plate 14 and produces hydrogen gas. This reaction tends to increase the amount of hydrogen gas produced by the electrolysis apparatus 10 in comparison to other electrolysis apparatuses having a cathode made from another material. For example, the stoichiometric chemical reaction for salt water electrolysis using inert metal electrodes is as follows:

$$6NaCl(aq) + 6H_2O(l) \rightarrow 3Cl_2(g) + 3H_2(g) + 6NaOH(aq) \quad (2)$$

In contrast, the stoichiometric chemical reaction for salt water electrolysis using an aluminum cathode is as follows:

$$6NaCl(aq) + 6H_2O(l) + 2Al(s) \rightarrow 3Cl_2(g) + 6H_2(g) + 2Na_3AlO_3(aq) \quad (3)$$

Comparing equations (2) and (3), under stoichiometric conditions, the electrolysis apparatus 10 tends to produce twice as much hydrogen gas in comparison to other electrolysis apparatuses having a cathode made from another material such as an inert metal (e.g. six moles of hydrogen in equation 3 instead of three moles of hydrogen in equation 2). However, it should be understood that these equations represent theoretical examples and actual reactions may yield different results.

When performing salt water electrolysis using the electrolysis apparatus 10, the aluminum cathode plates 14 gradually deteriorate as they react with the sodium hydroxide (as indicated by equation 3), and the aluminum cathode plates 14 may eventually require replacement. Accordingly, in some embodiments, the aluminum cathode plates 14 may be removably mounted within the apparatus 10 as will be described below.

Figure 2:
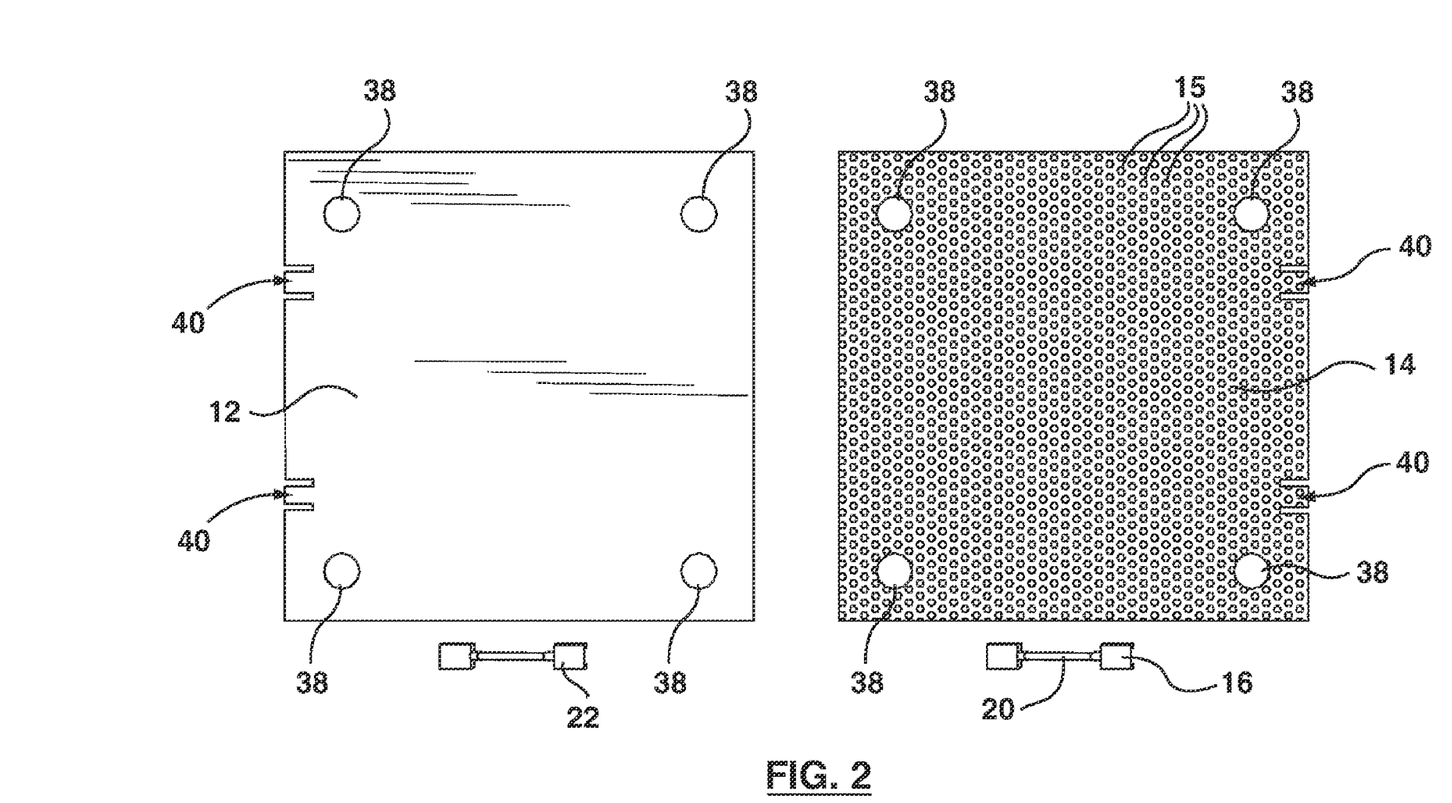
FIG. 2 is a plan view of two different metal plates used in the apparatus of FIG. 1, namely a cathode plate and an anode plate.

The inventor has also recognized that the chemical reactions that produce hydrogen gas tend to occur on the surface of the cathode plates 14, and it may be desirable to increase the surface area of the cathode plates 14 so as to increase the amount of hydrogen produced. Accordingly, the aluminum cathode plate 14 may have a multiplicity of apertures 15 (as shown in FIG. 2), which increases the surface area of the cathode and significantly increases the amount of hydrogen produced.

In some embodiments, the apertures 15 in the cathode plate 14 may have a diameter of between approximately 0.030 and 0.100 inches. More particularly, the apertures 15 in the cathode plate 14 may have a diameter of approximately 1/16 of an inch and a density of approximately 64 apertures per square inch.

Furthermore, the apertures 15 may be distributed in a pattern so as to provide a perforated aluminum cathode plate 14. For example, the apertures 15 may be uniformly distributed in rows and columns.

While the apertures 15 of the illustrated embodiment are circular, the apertures 15 may be other shapes such as square, oval, or amorphous (which may be the case as the aluminum cathode plate 14 gradually deteriorates), and the like.

In the illustrated embodiment, the anode plates 12 are made from zinc, which provides corrosion resistance and good electrical conductivity, which may tend to increase the efficiency of salt water electrolysis. In other embodiments, the anode plates 12 may be made from another material such as zinc coated metal (i.e. galvanized steel) or another conductive material with corrosion resistance such as platinum or stainless steel.

In the illustrated embodiment, the anode plates 12 and the cathode plates 14 are four-inch square plates having a thickness of approximately 1/32 of an inch. In other embodiments, the plates 12 and 14 may have different sizes and shapes.

It has been determined that the electrolysis apparatus 10 having a perforated aluminum cathode plate 14 and a zinc anode plate 12 as described above tends to be an effective combination for salt water electrolysis.

Figure 3:
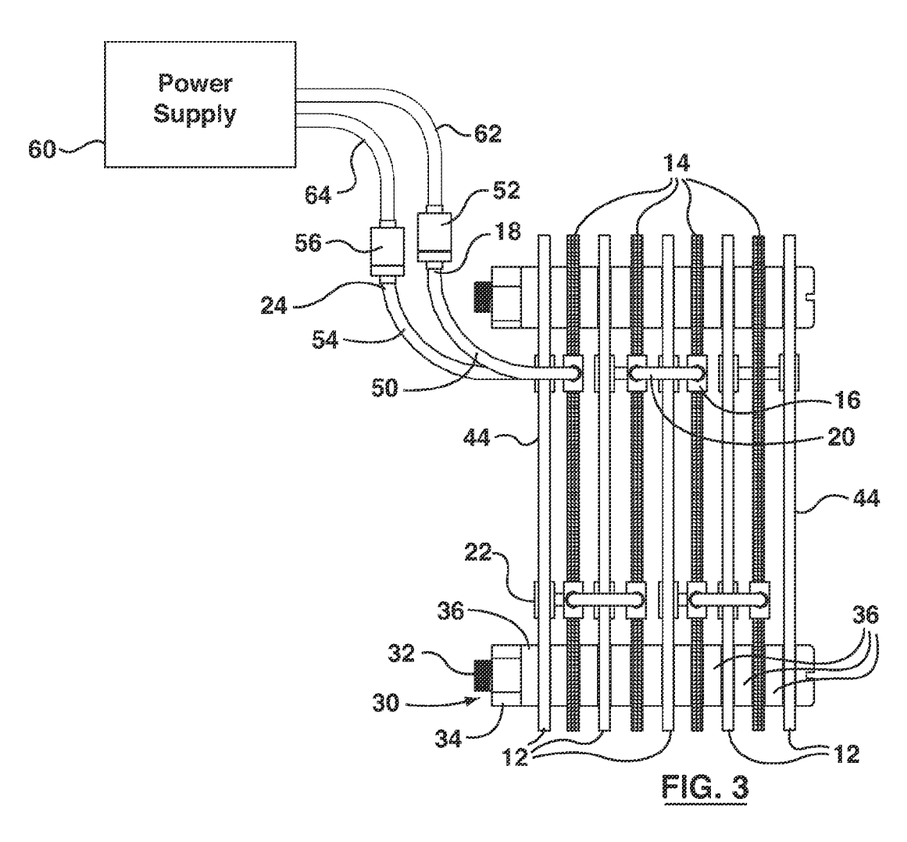
FIG. 3 is a side elevation view of the apparatus of FIG. 1 showing the metal plates connected together using non-conductive spacers and a power supply connected to the metal plates.

Referring to FIGS. 1-3, the electrolysis apparatus will now be described in greater detail.

In the illustrated embodiment, the apparatus 10 includes a plurality of cathode plates 14 and a plurality of anode plates 12. In particular, there are nine plates in total, five anode plates 12 and four cathode plates 14. The plates 12 and 14 are arranged in alternating sequence such that each cathode plate 14 is spaced apart from an adjacent anode plate 12 (e.g. one cathode plate followed by one anode plate). In other embodiments, there may be a different number of plates, for example, at least one anode plate 12 and at least one cathode plate 14.

The plurality of aluminum cathode plates 14 are electrically interconnected to each other in parallel using cathode couplers 16. For example, the cathode couplers 16 may be push on couplers that can be used to form a continuous link between the cathode plates 14. In the illustrated embodiment, the push on couplers 16 include an appropriate gauge wire 20 having two female nylon clips at the ends of the wire 20 that slide over two respective cathode plates 14. The wire 20 is crimped inside the clips and is in electrical contact with each cathode plate 14 so as to electrically interconnect two cathode plates 14. In other embodiments, the cathode couplers 16 may be connected to the cathode plates in different ways, for example, by soldering the wires to the plates, or otherwise.

As shown in FIG. 3, one of the cathode plates 14 is connected to a negative terminal of a direct current power supply 60, which indirectly connects the remaining cathode plates 14 to the power supply 60. In the illustrated embodiment, the apparatus 10 includes a cathode end connector 18 for electrically connecting the cathode plates 14 to the power supply 60. The cathode end connector 18 includes an appropriate gauge wire with a female nylon clip on one end of the wire, and a male disconnect at the other end of the wire. The female nylon clip can slide onto the cathode plate 14 and the male disconnect can be connected to the power supply 60. In other embodiments, the cathode plates 14 may be connected to the power supply 60 in different ways, for example, using other types of cathode end connectors.

The plurality of anode plates 12 are electrically interconnected to each other in parallel using anode couplers 22. For example, the anode couplers 22 may be push on couplers that can be used to form a continuous link between the anode plates. In the illustrated embodiment, the anode couplers 22 are generally similar to the cathode couplers 16 and include an appropriate gauge wire with two female nylon clips. In other embodiments, the anode couplers 22 may be connected to the cathode plates in different ways, for example, by soldering the wires to the plates, or otherwise.

One of the anode plates 12 is connected to a positive terminal of the direct current power supply 60, which indirectly connects the remaining anode plates 12 to the direct current power supply 60. In the illustrated embodiment, the apparatus 10 includes an anode end connector 24 for electrically connecting the anode plates 12 to the power supply 60. For example, the anode end connector 24 may be generally similar to the cathode end connector 18 and may include an appropriate gauge wire with a female nylon clip and a male disconnect. In other embodiments, the anode plates 12 may be connected to the power supply 60 in different ways, for example, using other types of anode end connectors.

The apparatus 10 also includes non-conductive spacers 30 coupled to the plates 12 and 14 for spacing apart the anode plates 12 and cathode plates 14 in an electrically insulated manner. For example, the non-conductive spacers 30 may include plastic bolts 32, plastic nuts 34 and plastic washers 36 for fastening the plates 12 and 14 together within the stack. These plastic components tend to electrically insulate the plates 12 and 14 from each other during electrolysis, while also positioning the plates within the stack.

The non-conductive spacers 30 may be removably coupled to the plates 12 and 14, for example, such that the plates 12 and 14 can be replaced. For example, the plastic nuts 34 may be unthreaded from the plastic bolts 32 such that the plates 12 and 14, and the washers 36 can be removed and replaced.

It may be desirable to remove the non-conductive spacers 30 so as to replace the aluminum cathode plates 14 as they deteriorate over time. Furthermore, it may be desirable remove the non-conductive spacers 30 so as to replace the zinc anode plates 12, for example, if they begin to corrode, which may otherwise decrease the efficiency of salt water electrolysis.

Referring to FIG. 2, illustrated therein are two types of metal plates used in the electrolysis apparatus 10. In particular, the zinc anode plate 12 is on the left and the aluminum cathode plate 14 is on the right. Illustrated below the plates 12 and 14 are the cathode couplers 16 and anode couplers 22, which can be used to electrically interconnect the cathode plates 14 and the anode plates 12 respectively.

Four holes 38 are drilled into each of the plates 12 and 14 for receiving four of the plastic bolts 32. As described previously, the plastic bolts 32 cooperate with the nuts 34 and washers 36 to couple the plates 12 and 14 together in a stack while electrically insulating the cathode plates 14 from the anode plates 12. In other embodiments, there may be a different number of holes 38, for example, depending on the number of plastic bolts 32 being used.

As described above, the cathode couplers 16 electrically interconnect the aluminum cathode plates 14 to form the cathode electrodes, and the anode couplers 22 electrically interconnect the zinc anode plates 12 to form the anode electrodes. To facilitate the use of couplers 16 and 22, each plate 12 and 14 may have tabs 40 cut into the side of the plate for receiving the couplers 16 and 22. For example, the anode plate 12 may have two tabs 40 on the left side for receiving two different anode couplers 22. In particular, one tab 40 may receive the female nylon clip of an anode coupler 22 that is coupled to a second anode plate 12, and the other tab 40 may receive the female nylon clip of a different anode coupler 22 that is coupled to a third anode plate 12.

Similarly, the cathode plate 14 has two tabs 40 on the right side. Positioning the tabs 40 of the cathode plate 14 on the opposite side as the tabs 40 of the anode plate 12 tends to prevent the cathode couplers 16 from interfering with the anode couplers 22.

Referring again to FIG. 3, the illustrated embodiment includes an even number of zinc anode plates 12 and an odd number of perforated aluminum cathode plates 14. For example, the stack may include five zinc anode plates 12 and four perforated aluminum plates 14.

In some embodiments, the apparatus 10 includes two end plates 44, which are solid zinc anode plates 12. The solid zinc end plates 44 tend to help direct gases produced by electrolysis upwards and out of the apparatus 10.

As described above, all of the cathode plates 14 are connected in parallel to the negative terminal of the direct current power supply 60. In particular, the aluminum cathode plate 14 closest to the bolt end (e.g. the left side of FIG. 3) is connected to the power supply 60 using the cathode end connector 18. The cathode end connector 18 includes a current supply wire 50 having a female nylon clip on one end and a male disconnect on the other end. The female nylon clip slides over one of the tabs 40 on the cathode plate 14. The male disconnect can be connected to the direct current power supply 60 through a corresponding female connector 52 on a wire 62 connected to the negative terminal of the direct current power supply 60.

Similarly, all of the anode plates 12 are connected in parallel to the positive terminal of the direct current power supply 60. In particular, the zinc anode plate 12 closest to the bolt end (e.g. the left side of FIG. 3) is connected to the power supply 60 using the anode end connector 24. The anode end connector 24 includes a current supply wire 54 having a female nylon clip on one end and a male disconnect on the other end. The female nylon clip slides over one of the tabs 40 on the anode plate 12. The male disconnect can be connected to the direct current power supply 60 through corresponding a female connector 56 on a wire 64 connected to the positive terminal of the direct current power supply 60.

Numerous tests were conducted using the stack illustrated in FIGS. 1 and 3, which has five zinc anode plates 12 and four perforated aluminum cathode plates 14. Furthermore, each of the plates 12 and 14 is approximately four-inches square and has a thickness of approximately 1/32 of an inch.

It has been determined that supplying approximately one volt of electrical potential across the plates in the stack at approximately one amp (e.g. approximately one watt of power) tends to provide an efficient means for producing hydrogen. For example, the apparatus 10 produced approximately 250 milliliters of hydrogen gas every fifteen minutes (e.g. 250 mL/W) while operating at these power levels. Furthermore, the apparatus 10 did not appear to produce an appreciable amount of chlorine gas, and the amount of chlorine produced may be less than anticipated by equation 3.

Increasing the power to two watts (e.g. approximately 1.4 volts and approximately 1.4 amperes) produced approximately 400 milliliters of hydrogen gas every fifteen minutes (e.g. 200 mL/W). There was also a noticeable increase in the amount of chlorine gas produced.

Increasing the power to five watts (e.g. approximately 2.2 volts and approximately 2.2 amperes) produced approximately 600 milliliters of hydrogen gas every fifteen minutes (e.g. 120 mL/W).

Based on this data, it may be desirable to configure the electrical power supply 60 to provide between approximately 0.8 and 1.2 volts of electrical potential and between approximately 0.8 and 1.2 amperes, in order to maximize the hydrogen gas produced per watt of power supplied.

In some embodiments, there may be a plurality of stacks supplied with approximately 0.8 and 1.2 volts and between approximately 0.8 and 1.2 amperes. Providing a plurality of stacks tends to increase the amount of hydrogen produced by salt water electrolysis.

In some embodiments, there may be a different number of plates 12 and 14 in the stack and the amount of power applied to each stack may be different. Accordingly, in some embodiments, the power supply 60 may be configured to supply between approximately 0.8 and 1.2 volts and an amperage based on the number of plates in the stack. For example, the amperage may be between approximately 0.1 and 0.4 amperes for each cathode plate 14 and each anode plate 12.

While the illustrated embodiment of FIGS. 1-3 includes plates 12 and 14 having a particular size, shape and surface area (e.g. approximately sixteen square-inches, not accounting for the plate thickness, apertures 15 and holes 38), other embodiments may include plates 12 and 14 having a different size, shape and surface area.

In some embodiments, each plate may have a different size, shape, or surface area, and the amount of power applied to each plate 12 and 14 may be different. Accordingly, in some embodiments, the power supply 60 may be configured to supply between approximately 0.8 and 1.2 volts and a current density based on the number of the plates in the stack and the size, shape and surface area of each plate. For example, the current density may be between approximately 0.003 and 0.03 amperes per square-inch for each cathode plate 14 and each anode plate 12.

Figure 4:
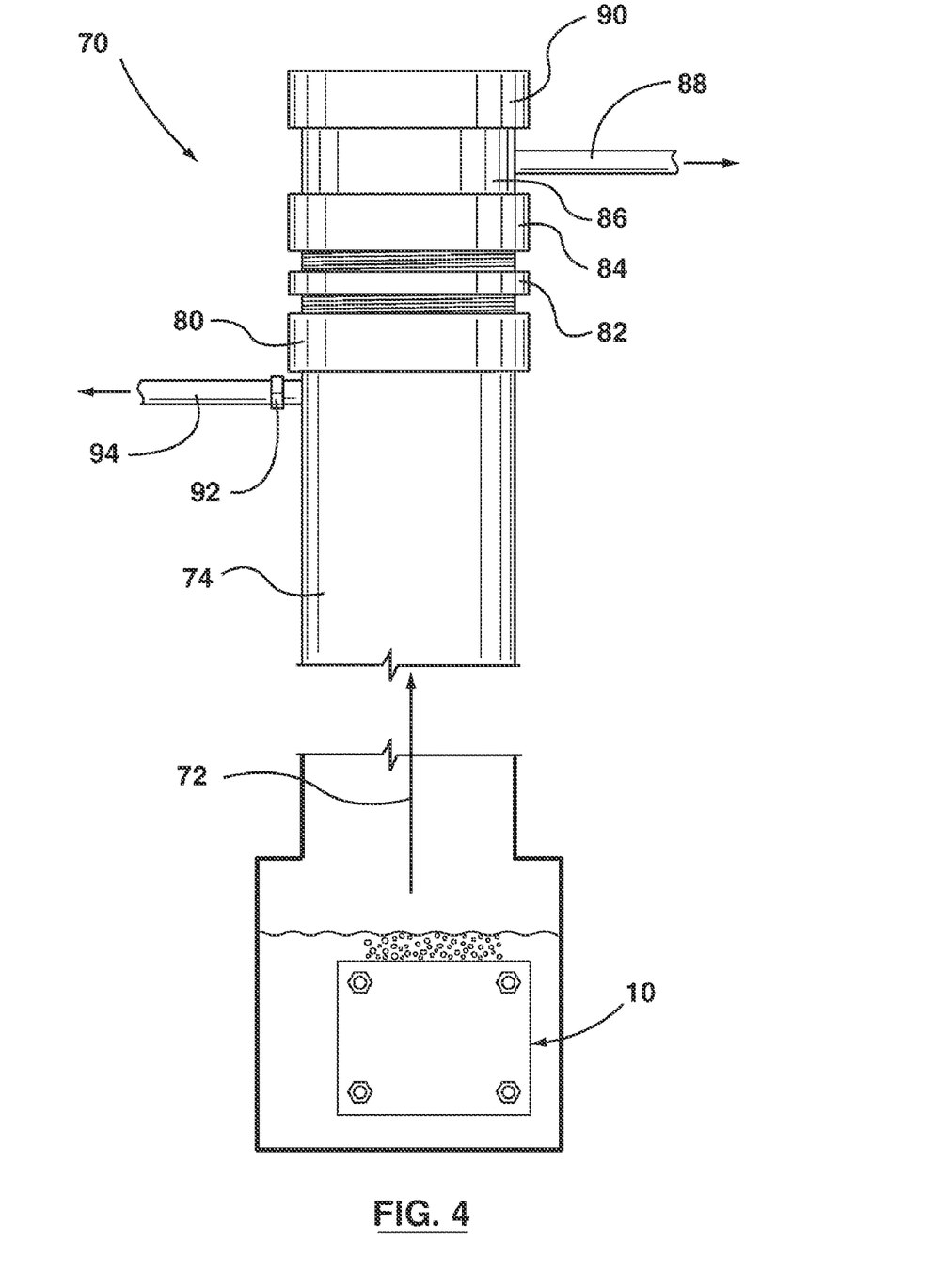
FIG. 4 is a schematic diagram of a gas separator that can be used to separate gases produced by the apparatus of FIG. 1.

Referring now to FIG. 4, illustrated therein is a gas separator 70, which can be used to separate gases produced by the apparatus 10. In particular, the apparatus 10 tends to produce hydrogen and chlorine gases during salt water electrolysis, which can be separated using the gas separator 70.

The gas separator 70 includes an airflow passageway having an inlet for receiving gases produced on the cathode plate and the anode plate. In the illustrated embodiment, the inlet is defined by an inlet pipe 74, which is generally positioned above the apparatus 10. Accordingly, when the apparatus 10 is oriented vertically in salt water so as to perform salt water electrolysis, the apparatus 10 produces gases 72, which tend to flow upward toward the surface of the salt water along the vertically oriented plates 12 and 14. The gases 72 then enter the inlet pipe 74 so that the gas separator 70 can separate the gases into two components, for example, one component comprising hydrogen, and another component comprising chlorine.

The airflow passageway of the gas separator 70 also has two outlets for conveying the separated gases. A first outlet pipe 88 defines a first outlet, and a second outlet pipe 94 defines a second outlet. The pipes 74, 88 and 94 may be made of a plastic such as ABS, a metal, or any other suitable material.

The gas separator 70 also includes a gas filter 82 for separating two gases. The gas filter is disposed in the airflow passageway between the inlet pipe 74 and the first outlet pipe 88, and downstream of the second outlet pipe 94.

The gas filter 82 is generally configured to allow a first type of gas to flow through the gas filter 82 and to the first outlet pipe 88 while blocking a second type of gas such that the second type of gas flows out the second outlet pipe 94. For example, the gas filter 82 may be a chlorine filter configured such that hydrogen gas can pass through the gas filter 82 while chlorine gas is blocked. In other embodiments, the gas filter 82 may have different configurations. For example, the gas filter 82 may block hydrogen and may allow chlorine to pass therethrough.

The gas separator 70 also includes various components for connecting the gas filter 82 to the inlet pipe 74 and the outlet pipe 88. For example, the inlet pipe 74 is coupled to an upstream end of the gas filter 82 using a first threaded coupler 80. The downstream end of the gas filter 82 is coupled to another ABS pipe 86 using another threaded coupler 84. The first outlet pipe 88 extends outward from the ABS pipe 86, and the ABS pipe 86 is fitted with a cap 90 such that filtered gas exists the gas filter 82 and out of the first outlet pipe 88.

The second outlet pipe 94 extends outward from the inlet pipe 74 upstream of the gas filter 82 so that air blocked by the gas filter 82 flows out of the second outlet pipe. For example, in the illustrated embodiment, the gas filter 82 inhibits the flow of chlorine gas therethrough such that the chlorine gas accumulates below the gas filter 82. The accumulated chlorine gas eventually exits the second outlet pipe 94 after passing through an air filter 92. The air filter 92 provides some resistance to hydrogen gas flowing toward the second outlet pipe 94 such that it is easier for the hydrogen to continue rising up through gas filter 82 and out the first outlet pipe 88 rather than push through the air filter 92. The separated gases can then be piped to separate storage containers.

Figure 5:
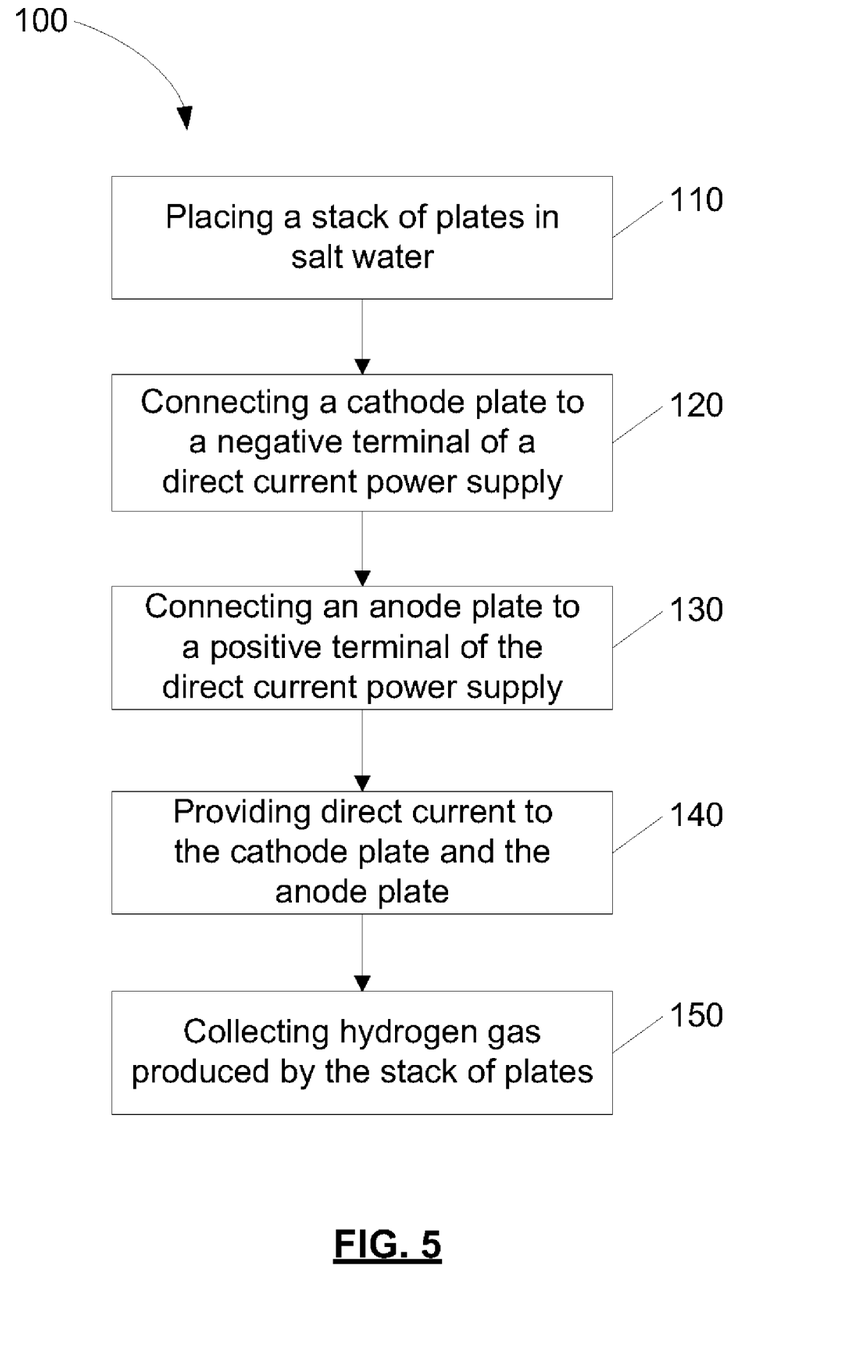
FIG. 5 is a flow chart illustrating a method for producing hydrogen from salt water electrolysis according to another embodiment of the invention.

Referring now to FIG. 5, illustrated therein is a method 100 of salt water electrolysis according to another embodiment of the invention.

Step 110 includes placing a stack of metal plates in salt water. The stack comprises at least one cathode plate, and at least one anode plate spaced apart from the cathode plate. The cathode plate is made from aluminum and the anode plate is made from zinc. For example, the stack may be similar to the stack of the electrolysis apparatus 10 described above.

Step 120 includes connecting the cathode plate to a negative terminal of a direct current electrical power supply. For example, the cathode plate may be connected to the power supply 60 described previously.

Step 130 includes connecting the anode plate to a positive terminal of the direct current electrical power supply. For example, the cathode plate may be connected to the power supply 60 described previously.

Step 140 includes providing direct current to the cathode plate and the anode plate. For example, step 140 may include providing between approximately 0.8 and 1.2 volts and between approximately 0.8 and 1.2 amperes when using the apparatus 10 described above.

In some embodiments, the method 100 may be used with an electrolysis apparatus having a different number of plates than the electrolysis apparatus 10. Accordingly, step 140 may include providing between approximately 0.8 and 1.2 volts and an amperage based on the number of plates in the stack. For example, the amperage may be between approximately 0.1 and 0.4 amperes for each cathode plate 14 and each anode plate 12.

In some embodiments, the method 100 may be used with an electrolysis apparatus having plates with different sizes than the electrolysis apparatus 10. Accordingly, step 140 may include providing between approximately 0.8 and 1.2 volts and a current density based on the number of the plates in the stack and the surface area of each plate. For example, the current density may be between approximately 0.003 and 0.03 amperes per square-inch for each cathode plate 14 and each anode plate 12.

Step 150 includes collecting hydrogen gas produced by the stack of metal plates. For example, the hydrogen gas may be collected using the gas separator 70 described above.

While the above description provides examples of one or more apparatus and methods, it will be appreciated that other apparatus and methods may be within the scope of the present description as interpreted by one of skill in the art.

I claim:

1. An apparatus for producing hydrogen from salt water by electrolysis, the apparatus comprising:
   a) at least one cathode plate;
   b) at least one anode plate spaced apart from the cathode plate;
   c) a cathode end connector for electrically connecting the cathode plate to a negative terminal of a direct current electrical power supply; and
   d) an anode end connector for electrically connecting the anode plate to a positive terminal of the direct current electrical power supply;
   e) wherein the at least one cathode plate is made from aluminum, and the at least one anode plate consists essentially of zinc.

2. The apparatus of claim 1, wherein the cathode plate consists essentially of aluminium and has a multiplicity of apertures therein.

3. The apparatus of claim 2, wherein the multiplicity of apertures is uniformly distributed in rows and columns.

4. The apparatus of claim 2, wherein the apertures in the cathode plate have a diameter of between approximately 0.030 and 0.100 inches.

5. The apparatus of claim 2, wherein the apertures in the cathode plate have a diameter of approximately 1/16 of an inch and a density of approximately 64 apertures per square inch.

6. The apparatus of claim 1, further comprising at least one non-conductive spacer coupled to the cathode plate and the anode plate for spacing apart the cathode plate from the anode plate in an electrically insulated manner.

7. The apparatus of claim 6, wherein the cathode plate is removably connected to the non-conductive spacer such that the cathode plate is replaceable.

8. The apparatus of claim 1, further comprising a gas separator for separating gases produced by electrolysis on the cathode plate and the anode plate, the gas separator having an inlet positioned for receiving the gases, a first outlet for exhausting a first type of gas, and a second outlet for exhausting a second type of gas.

9. The apparatus of claim 8, wherein the gas separator further comprises a gas filter disposed between the inlet and the first outlet and downstream of the second outlet, the gas filter being configured to allow the first type of gas to flow through the filter and to the first outlet, and configured to block the second type of gas such that the second type of gas flows to the second outlet.

10. An apparatus for producing hydrogen from salt water by electrolysis, the apparatus comprising:
    a) a stack of plates including a plurality of cathode plates and a plurality of anode plates, the cathode plates and the anode plates being arranged in an alternating sequence such that each cathode plate is spaced apart from an adjacent anode plate;
    b) a plurality of cathode connectors for electrically interconnecting the plurality of cathode plates;
    c) a plurality of anode connectors for electrically interconnecting the plurality of anode plates;
    d) a direct current electrical power supply configured to provide power to the cathode plates and the anode plates;
    e) a cathode end connector electrically connected to one of the cathode plates and electrically connected to a negative terminal of the direct current electrical power supply; and
    f) an anode end connector electrically connected to one of the anode plates and electrically connected to a positive terminal of the direct current electrical power supply;
    g) wherein each cathode plate consists essentially of aluminum, and each anode plate consists essentially of zinc.

11. The apparatus of claim 10, wherein each aluminum cathode plate has a multiplicity of apertures therein.

12. The apparatus of claim 11, wherein each plate has a size of approximately four inches square.

13. The apparatus of claim 12, wherein there are five zinc anode plates and four aluminum cathode plates.

14. The apparatus of claim 13, wherein the direct current electrical power supply is configured to provide between approximately 0.8 and 1.2 volts and between approximately 0.8 and 1.2 amperes.

15. The apparatus of claim 10, wherein the direct current electrical power supply is configured to provide between approximately 0.8 volts and 1.2 volts.

16. The apparatus of claim 10, wherein the plurality of anode plates comprises a first solid end plate and a second solid end plate disposed at opposing ends of the stack.

17. The apparatus of claim 10, further comprising a gas separator for separating gases produced by electrolysis on the cathode plate and the anode plate, the gas separator having an inlet positioned for receiving the gases, a first outlet for exhausting a first type of gas, and a second outlet for exhausting a second type of gas.

18. The apparatus of claim 17, wherein the gas separator further comprises a gas filter disposed between the inlet and the first outlet and downstream of the second outlet, the gas filter being configured to allow the first type of gas to flow through the filter and to the first outlet, and configured to block the second type of gas such that the second type of gas flows to the second outlet.

19. A method of producing hydrogen from salt water by electrolysis, the method comprising:

a) placing a stack of plates in salt water, the stack comprising at least one cathode plate and at least one anode plate, the cathode plate and the anode plate being arranged such that the cathode plate is spaced apart the anode plate, wherein the cathode plate consists essentially of aluminum, and the anode plate consists essentially of zinc;

b) connecting the cathode plate to a negative terminal of a direct current electrical power supply;

c) connecting the anode plate to a positive terminal of the direct current electrical power supply;

d) providing direct current to the cathode plate and the anode plate; and e) collecting hydrogen gas produced by the plates.

20. The method of claim 19, wherein the step of providing direct current includes providing between approximately 0.8 and 1.2 volts of electrical power.

* * * * *